United States Patent
Boydstun et al.

(10) Patent No.: US 7,664,575 B2
(45) Date of Patent: Feb. 16, 2010

(54) CONTINGENCY MODE OPERATING METHOD FOR AIR CONDITIONING SYSTEM

(75) Inventors: Roger L. Boydstun, Tyler, TX (US); Gordon Jeffrey Hugghins, Jacksonville, TX (US)

(73) Assignee: Trane International Inc., Piscataway, NJ (US)

( * ) Notice: Subject to any disclaimer, the term of this patent is extended or adjusted under 35 U.S.C. 154(b) by 225 days.

(21) Appl. No.: 11/893,187

(22) Filed: Aug. 15, 2007

(65) Prior Publication Data

US 2009/0048715 A1    Feb. 19, 2009

(51) Int. Cl.
*G01M 1/38* (2006.01)
*G05B 13/00* (2006.01)
*G05B 15/00* (2006.01)
*G05D 23/00* (2006.01)
*F28F 27/00* (2006.01)
*A47J 39/00* (2006.01)
*F24F 11/02* (2006.01)

(52) U.S. Cl. .............. 700/276; 700/277; 700/278; 165/200; 165/201; 165/237; 454/229; 454/237; 454/238

(58) Field of Classification Search ......... 700/276–278; 165/200–201, 237; 454/229, 237–238
See application file for complete search history.

(56) References Cited

U.S. PATENT DOCUMENTS

| | | | |
|---|---|---|---|
| 4,314,665 A * | 2/1982 | Levine | 236/46 R |
| 4,442,885 A | 4/1984 | Matsuzaki | |
| 4,449,362 A * | 5/1984 | Frankenberg et al. | 60/274 |
| 4,787,555 A | 11/1988 | Newell, III | |
| 5,276,630 A * | 1/1994 | Baldwin et al. | 700/276 |
| 5,289,362 A * | 2/1994 | Liebl et al. | 700/22 |
| 6,066,194 A * | 5/2000 | Hugghins et al. | 96/397 |
| 2005/0092317 A1* | 5/2005 | Hugghins et al. | 126/116 A |
| 2007/0012052 A1* | 1/2007 | Butler et al. | 62/181 |
| 2007/0095082 A1* | 5/2007 | Garrett et al. | 62/180 |
| 2008/0000246 A1* | 1/2008 | Ha et al. | 62/228.1 |
| 2008/0011864 A1* | 1/2008 | Tessier et al. | 236/51 |
| 2008/0183424 A1* | 7/2008 | Seem | 702/181 |
| 2008/0211663 A1* | 9/2008 | Mansfield et al. | 340/538 |

* cited by examiner

Primary Examiner—Ramesh B Patel
(74) Attorney, Agent, or Firm—Conley Rose, P.C.; J. Robert Brown, Jr.

(57) ABSTRACT

An air conditioning apparatus including a heater or furnace includes a controller for receiving control signals from a thermostat and from a user interface for initiating a contingency mode of operation when a signal from the thermostat is not available. The user interface includes a visual display and multiple keys for entering the contingency mode which includes selecting a capacity of heat output of the apparatus and a duty cycle. The user interface may be disposed in the apparatus cabinet and connected directly to a microprocessor based controller for the apparatus. The contingency mode is automatically aborted if a fault signal is received by the controller, a signal is received from a thermostat or power to the apparatus is interrupted.

21 Claims, 2 Drawing Sheets

CONTINGENCY MODE OPERATING METHOD FOR AIR CONDITIONING SYSTEM

BACKGROUND OF THE INVENTION

In the art of air conditioning apparatus or systems, otherwise known as heating, ventilating and air conditioning (HVAC) equipment, improvements have provided systems which operate with thermostats and similar sensors which transmit digital signals to a system main controller. In the event that a thermostat or other sensor or control feature which normally sends digital signals is not available, is defective or becomes disconnected from the system controller it is not possible to operate the air conditioning system with a simple timer or manually actuated switch. Accordingly, there has been a need to develop a means and method for operating digitally controlled HVAC equipment in a so called contingency mode when a thermostat or similar type controller is not functioning properly, is not connected to the system controller or is currently not installed in the space or spaces for which the air conditioning equipment is to service. However, the present invention provides for operating a unit of air conditioning equipment or system of the general type described above in such a contingency mode.

SUMMARY OF THE INVENTION

The present invention provides an improved method of operating an air conditioning system, particularly a system which relies on digital signals to provide a call for heating or cooling to a main controller or control unit of the system.

In accordance with one aspect of the present invention a so called contingency mode or method of operating an air conditioning system is provided wherein a user operable interface is operably connected to the main or primary system controller for establishing certain permitted operating modes when a thermostat, normally connected to the system, is not present or not operable.

In accordance with another aspect of the invention, a method is provided for allowing a user of a unit of air conditioning equipment to select a desired level of equipment capacity, such as in a multi-stage furnace, for example, and select a desired on/off duty cycle. The method of the invention provides for placing a so-called contingency mode computer program or software in a separate controller or microprocessor which may be included in or releasably connected to a main system controller. Moreover, the method of operating in the so called contingency mode may also be configured as to not be available for use by a user or operator of the system if a thermostat or similar controller is operably connected to the system main controller.

Those skilled in the art will recognize the above mentioned advantages and features of the invention together with other important aspects thereof upon reading the detailed description which follows in conjunction with the drawings.

DETAILED DESCRIPTION OF A PREFERRED EMBODIMENT

Figure 1:
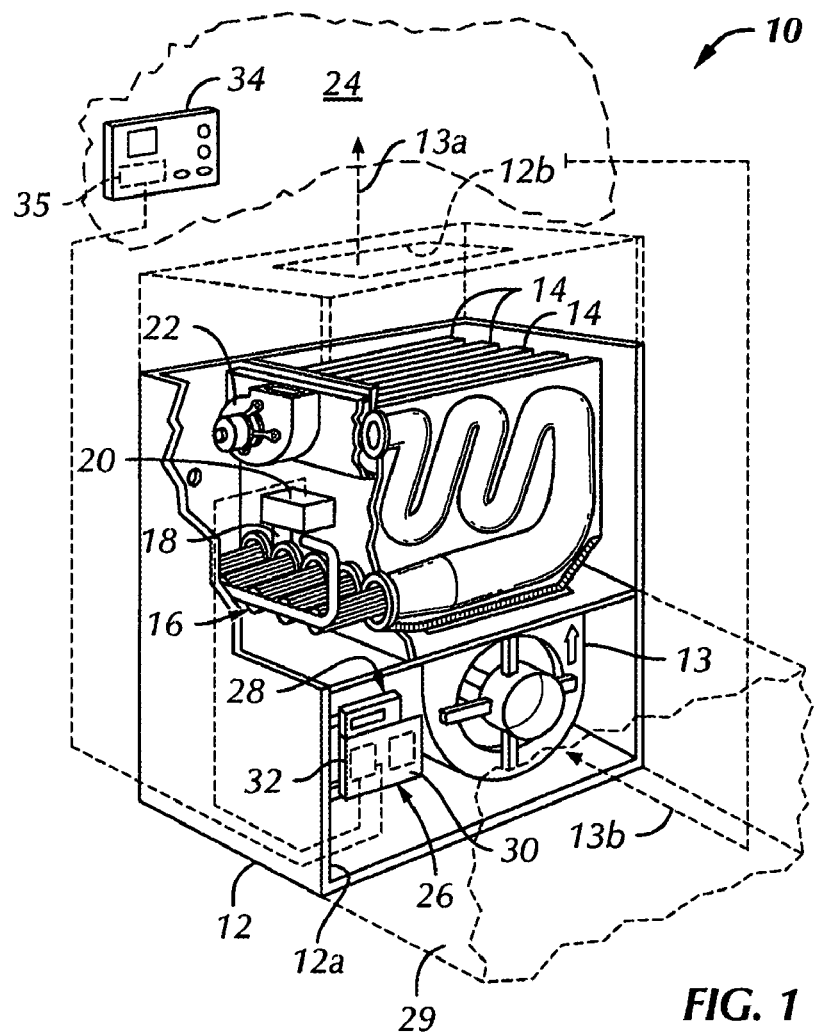
FIG. 1 is a perspective view, in somewhat schematic form, of a multi-stage furnace operable in accordance with the contingency mode or method of the present invention.

In the description which follows like elements are marked throughout the drawings and specification with the same reference numerals, respectively. The drawing figures are in somewhat schematic form in the interest of clarity and conciseness.

The contingency mode or method described herein may be used in various configurations of HVAC equipment otherwise known as air conditioning equipment, including equipment providing for cooling only, heating only or both heating and cooling. For purposes of this discussion the invention will be described for use in conjunction with a multi-stage forced air combustion furnace, generally designated by the numeral 10 in FIG. 1. The furnace 10 includes a cabinet 12 in which a motor driven air circulating blower 13 is disposed for circulating air from an inlet opening 12a through the interior of the cabinet and over heat exchangers 14 which are fired by respective burners 16 in a manner well known. Combustion fuel, such as natural gas, is supplied to the burners 16 by way of a motor operated valve 18, including a valve controller 20. Furnace 10 may be of a type which includes a heat exchanger ventilating or inducer blower 22 which draws air and combustion products through the heat exchangers 14 in a forced manner, also known to those skilled in the art. Conditioned air is discharged from the furnace 10 through a discharge opening 12b and is circulated to and from an enclosed space 24, as indicated by the air flow direction arrows 13a and 13b in FIG. 1.

Figure 2:
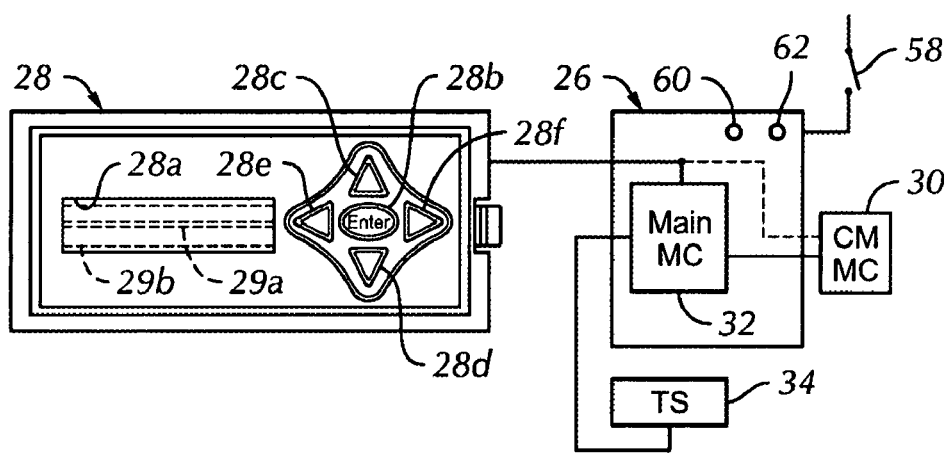
FIG. 2 is a diagram illustrating a user interface for setting and controlling certain parameters of the contingency mode or method of operating an air conditioning or furnace apparatus.

Control of the furnace 10, including control of the circulating air blower 13, the valve 18 and the ventilating or inducer blower 22 is the responsibility of a main or primary controller unit 26 which may be disposed within cabinet 12, as indicated in FIG. 1. Controller unit 26 includes or is adapted to be connected to a user interface 28 which is operable to be in communication with a microprocessor 30 operably connected to a primary microprocessor 32 of the controller unit 26, see FIG. 2. Microprocessors or microcontrollers 30 and 32 may be permanently connected or microcontroller 30 may be a separate plug-in module with respect to the controller unit 26. A communicating thermostat 34, FIGS. 1 and 2, is shown connected to the microcontroller 32 for communicating control signals, including a call for heat, in a known manner. Signals are transmitted between microcontroller 32 and thermostat 34 by conventional wiring or by other means, including radio frequency transmission or optical signals, for example. In this respect thermostat 34 may include its own microcontroller 35, FIG. 1.

Refer briefly to FIG. 2, the user interface 28 preferably includes a visual display 28a and user actuatable keys or switch actuators comprising an "Enter" key 28b and scrolling keys 28c and 28d for so called up and down scrolling and left/right keys 28e and 28f for selecting menu options shown on the display. Thanks to the availability of the user interface 28 at the apparatus 10, including a suitable mounting within the cabinet 12, if power is supplied to the air conditioning apparatus 10, the apparatus may be operated in the inventive contingency mode or method even if the thermostat 34 is not installed or is not operably connected to the apparatus controller unit 26, for example.

Figure 3:
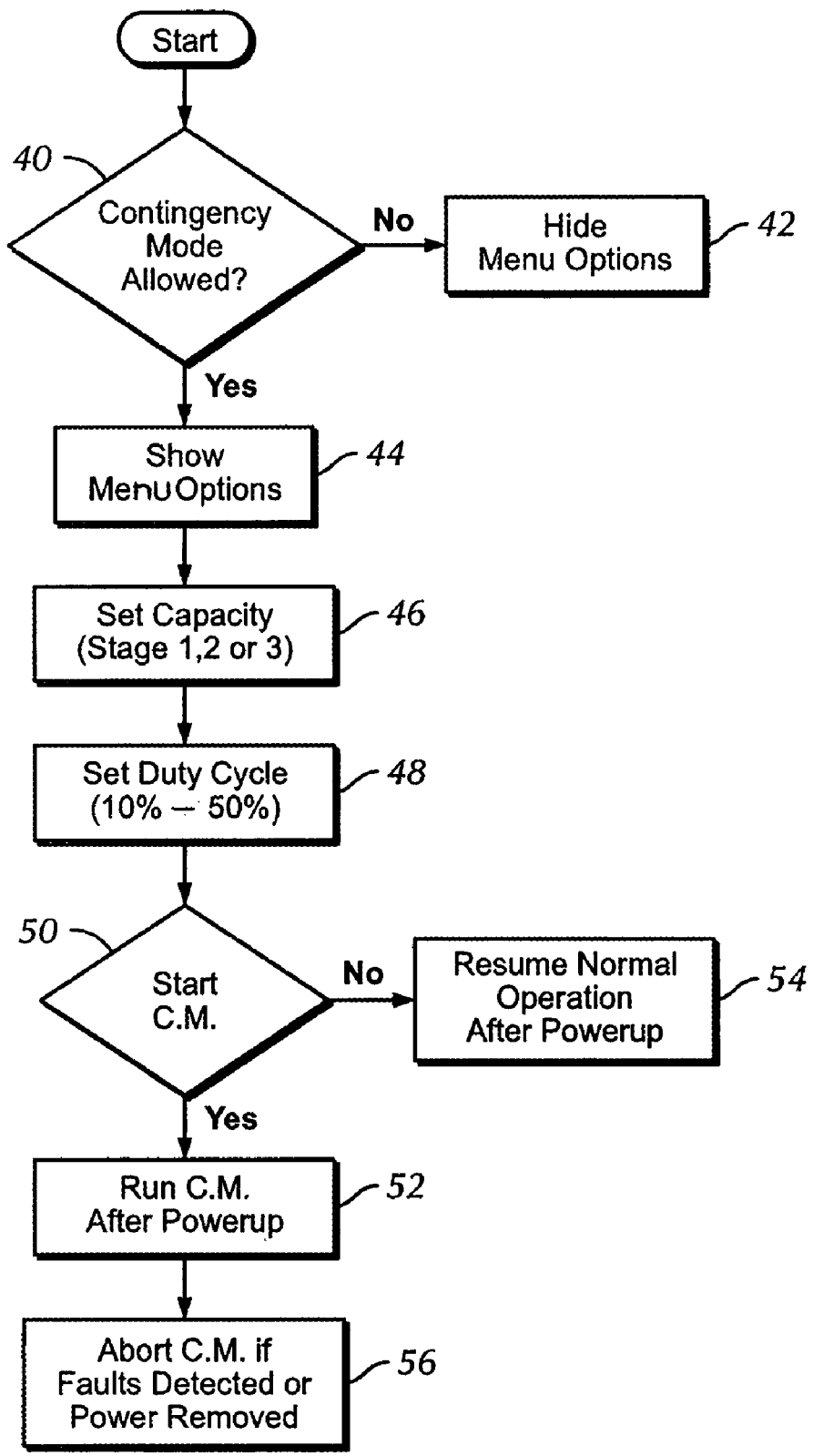
FIG. 3 is a generalized flow diagram illustrating certain steps associated with entering the contingency mode of operation.

If the thermostat 34 is operably connected to the controller unit 26, the so called contingency mode or method will not be allowed to operate and no contingency mode menu options will be displayed at the display 28a, as indicated by steps 40 and 42 in the diagram of FIG. 3. The user interface 28 may be operated to display certain information related to the particular identification of the air conditioning apparatus or furnace 10, set certain operating parameters and determine certain fault conditions identified by or managed by the controller unit 26. Controller unit 26 is operable to control the motors for the blowers 13 and 22, the control valve 18 and to receive signals from various sensors, including pressure sensors and temperature sensors typically associated with a multi-stage furnace, for example.

Accordingly, if thermostat 34 is not connected to apparatus 10, is not functioning or has not been installed in space 24, the contingency mode of operating the apparatus 10 may be initiated by actuating key 28b. If the contingency mode is not allowed at step 40, FIG. 3, the words "NOT AVAILABLE" may be displayed on line 29a of the two line visual display 28a. If the contingency mode is allowed at step 40 the process will proceed to step 44 whereby the words "CONTINGENCY MODE" will be displayed on line 29a and the words "STAGE, DUTY CYCLE, and START" will appear on line 29b of the display 28a. At this point keys 28e or 28f may be used to select either STAGE, DUTY CYCLE or START. If the apparatus 10 is a multi-stage furnace it may be set to operate as a single stage, two stage or three stage. Accordingly, upon selection of STAGE using the keys 28e and 28f, followed by actuation of key 28b, the words STAGE or SET CAPACITY will appear on the display as indicated at step 46, FIG. 3 and the choices "OFF", 1, 2 and 3 will appear on line 29b. A selection of OFF will result in the controller 26 returning to a stand-by mode and a default value will revert to OFF if the menu is aborted. At any point in the set up process, if one of capacity Nos. 1, 2 or 3 is selected the controller 26 will cause the apparatus 10 to operate accordingly in a first stage, second stage or third stage furnace operating mode.

Since there is no thermostat operating to control the on or off function of the gas valve 18 and burners 16, in addition to the furnace "capacity" setting a "duty cycle" setting is required to be selected or set, as indicated at step 48, FIG. 3. By returning to the contingency mode setup menu, the menu option DUTY CYCLE may be selected by suitable actuation of the keys or switch actuators 28e, 28f and 28b. On selection of the duty cycle menu or sub-menu the choices may be a duty cycle, for example, of 10% to 50% in 10% increments and 10% will be a default value. The default value will be reverted to once the menu is aborted without entering the contingency mode or the contingency mode is terminated. A 10% duty cycle is defined as a cycle wherein the burners 16 are operated for two minutes and are then off for eighteen minutes and a 50% duty cycle will fire the burners 16 for ten minutes and then off for ten minutes. Duty cycles are repeated three times per hour. Upon completion of selection of the duty cycle at step 48, the process continues to step 50 whereby the display 28a may prompt the user by displaying start CONTINGENCY MODE, or "Start C.M." which operation may be initiated by, for example, actuating key 28b whereby the contingency mode will begin operation at step 52. If, at step 50, the user elects no response to the "start contingency mode" query, the control system or controller 26 will resume normal operation at step 54. Of course, during operation in the contingency mode, if any faults are detected in operation of the system or apparatus 10, including a loss of power, the contingency mode will be aborted at step 56, FIG. 3.

In particular, the contingency mode or method of operation of the apparatus 10 can only be entered at the user interface 28 and can only operate when the apparatus is functioning as a furnace or is in a heating mode of operation, if such apparatus also includes an air cooling component, for example. If and when thermostat 34 is not communicating or transmitting a signal indicating its presence to the control unit or controller 26, the contingency mode may be entered by, for example, opening a switch 58, FIG. 2, supplying power to the controller unit 26 and the motors for the respective blowers 13 and 22. One or more visual indicators 60 and 62 associated with the controller 26 may be used to give a visual indication that power has been removed from the controller 26 and/or the controller 26 is also not receiving a fault signal. After closing switch 58, the user interface 28 may be operated by actuating one of the keys 28c or 28d to select "CONTINGENCY MODE" on the display 28a after which key 28b may be actuated to show on the display the identifier CONTINGENCY MODE and "STAGE". At this time a first, second or third stage or capacity of heating must be selected using the keys 28e and 28f. After the stage or capacity of the system 10 is selected by actuating the key 28b that capacity value is communicated to the controller 26.

After selecting the capacity or stage of operation (Stage 1, Stage 2 or Stage 3) the term DUTY CYCLE and 10% will be displayed at the display 28a and a duty cycle of between 10% and 50% must be selected, as previously mentioned. The selection is carried out by using the keys 28e and 28f while viewing the display 28a. After selection of the duty cycle the word "START, YES or NO" may be displayed at display 28a and keys 28e and 28f may now be used to select YES followed by actuation of key 28b. The user interface 28 may prompt the user again by displaying "ARE YOU SURE" and "NO". Confirmation may be carried out by scrolling laterally with keys 28e and 28f until the term "YES" appears on display 28a followed by actuation of key 28b. The contingency mode may be initialized by opening switch 58 and observing one or the other of indicators 60 and 62 and, when such indicator is extinguished, switch 58 may be closed again to confirm the contingency mode. The term CONTINGENCY MODE will appear in display 28a on line 29a, and the capacity or stage number selected and the duty cycle percent number will be displayed on line 29b.

All furnace operating safety features and switches connected to the controller 26 will be monitored for proper operation of the apparatus during operation in the contingency mode. Switches associated with the keys 28c, 28d, 28e and 28f will be inactive during the contingency mode. The contingency mode of operation will also cease upon receipt of a signal indicating reconnection or communication with the thermostat 34, power being removed from the controller 26 and then restored, any requirement to reset controller 26 or any fault being detected by the controller which will result in illumination and/or flashing of one or the other of the indicators 60 and 62, for example. Accordingly, to purposely exit the contingency mode the switch 58 may be opened and then re-closed, for example.

Accordingly, if a signal is not being received by the controller 26 from a sensor or a control device, such as the thermostat 34, a user of the apparatus 10 may select the manual or so called stand alone or contingency mode of operation, thanks to the method of the present invention. Those skilled in the art will appreciate that commercially available controllers, including microcontrollers or microprocessors, such as the processors 30 and/or 32, may be suitably programmed to carry out the method steps described herein. Commercially available control components otherwise known to those skilled in the art may also be used to provide the controller 26 and the components of the apparatus 10 described hereinbefore.

Although a preferred embodiment of the invention has been described in detail, those skilled in the art will recognize that various substitutions and modifications may be made without departing from the scope and spirit of the appended claims.

What is claimed is:

1. In an air conditioning apparatus for conditioning air to be circulated to an enclosed space, a controller for controlling operation of said apparatus, and a user interface operably connected to said controller for inputting selected control functions by a user of said apparatus, a method comprising the steps of:
selecting a contingency mode of operation by way of said interface, wherein the contingency mode of operation is selected based on the controller failing to receive a signal;
selecting, as part of the contingency mode of operation, at least one of a capacity of air conditioning to be produced by said apparatus and a duty cycle of said apparatus by way of said interface; and
initiating said contingency mode of operation.

2. The method set forth in claim 1 including the step of:
aborting selecting said contingency mode of operation if a fault signal is received by said controller.

3. The method set forth in claim 1 including the step of:
aborting selecting said contingency mode of operation if power to one of said apparatus and said controller is interrupted.

4. The method set forth in claim 1 including the step of:
aborting selecting said contingency mode of operation if a signal is received by said controller from said thermostat.

5. The method set forth in claim 1 including the step of:
providing said controller to include a controller microprocessor and providing a program for said contingency mode of operation resident on one of said controller microprocessor and another microprocessor operably connected to said controller microprocessor.

6. The method set forth in claim 1 including the step of:
providing said interface to include a visual display and plural user operable keys for commanding said interface to carry out selected steps to establish said contingency mode of operation.

7. The method set forth in claim 6 including the step of:
selecting an operating capacity of said apparatus in response to a message on said display.

8. The method set forth in claim 6 including the step of:
selecting a duty cycle of operation of said apparatus in response to a message on said display.

9. The method set forth in claim 8 including the step of:
selecting a duty cycle of operation of said apparatus of from 10% to 50% wherein said duty cycle of 10% includes operating said apparatus for two minutes and turning said apparatus off for eighteen minutes, and a duty cycle of 50% comprises operating said apparatus for ten minutes and turning said apparatus off for ten minutes.

10. The method set forth in claim 9 including a step of:
repeating a duty cycle multiple times per unit of time.

11. The method set forth in claim 1 including the step of:
providing said interface disposed in a cabinet of said apparatus.

12. The method set forth in claim 1 wherein the contingency mode of operation is further selected based on the apparatus being otherwise operational, and wherein when in a mode other than contingency mode the apparatus fails to function in the event of failure to receive the signal.

13. In an air conditioning apparatus for conditioning air to be circulated to an enclosed space, a controller for controlling operation of said air conditioning apparatus including first and second microprocessors, and a user interface operably connected to said controller for commanding selected control functions by a user of said apparatus, a method of controlling said apparatus comprising the steps of:
selecting a contingency mode of operation of said apparatus by way of said interface, wherein the contingency mode of operation is selected based on the controller failing to receive a signal;
selecting, as part of the contingency mode of operation, at least one of a capacity of air conditioning to be produced by said apparatus and a duty cycle of said apparatus;
initiating said contingency mode of operation; and
aborting selecting said contingency mode of operation if one of a fault signal is received by said controller, power to one of said apparatus and said controller is interrupted, and a signal is received by said controller from a thermostat.

14. The method set forth in claim 13 wherein the steps of said method are carried out at least in part by a program resident on one of said microprocessors.

15. The method set forth in claim 13 including the step of:
providing said interface to include a visual display and plural keys for commanding said interface to carry out selected steps of said contingency mode of operation.

16. The method set forth in claim 15 including the step of:
selecting said capacity to be produced by said apparatus in response to a message on said display.

17. The method set forth in claim 15 including the step of:
selecting said duty cycle of operation of said apparatus in response to a message on said display.

18. The method set forth in claim 17 including the step of:
selecting a duty cycle of said apparatus of from 10% to 50% wherein said duty cycle of 10% includes operating said apparatus for two minutes and turning said apparatus off for eighteen minutes, and a duty cycle of 50% comprises operating said apparatus for ten minutes and then turning said apparatus off for ten minutes.

19. The method set forth in claim 18 including a step of:
repeating a duty cycle multiple times per unit of time.

20. In an air conditioning apparatus for conditioning air to be circulated to an enclosed space, a controller for controlling operation of said air conditioning apparatus including at least a first microprocessor and a thermostat, and a user interface operably connected to said controller, said interface including a visual display and plural keys for commanding selected control functions by a user of said apparatus, a method of controlling said apparatus by way of said interface comprising the steps of:
selecting a contingency mode of operation of said apparatus in response to a message on said display, wherein the contingency mode of operation is selected based on failing to receive a signal from the thermostat;
selecting, as part of the contingency mode of operation, a capacity of air conditioning to be produced by said apparatus and a duty cycle of said apparatus in response to messages on said display; and
initiating said contingency mode of operation.

21. The method set forth in claim 20 including the steps of:
aborting said selecting the contingency mode of operation if one of a fault signal is received by said controller, power to one of said apparatus and said controller is interrupted, and a signal is received by said controller from said thermostat.

* * * * *